US009764613B2

(12) United States Patent
Rowe et al.

(10) Patent No.: US 9,764,613 B2
(45) Date of Patent: *Sep. 19, 2017

(54) CO-AXIAL SWAY BAR FOR A SUSPENSION SYSTEM

(71) Applicant: Oshkosh Defense, LLC, Oshkosh, WI (US)

(72) Inventors: Ryan F. Rowe, Oshkosh, WI (US); Andrew L. Drach, Neenah, WI (US); Jeffrey W. Schwyn, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,025

(22) Filed: Apr. 27, 2015

(65) Prior Publication Data

US 2015/0224847 A1 Aug. 13, 2015

Related U.S. Application Data

(63) Continuation of application No. 13/676,698, filed on Nov. 14, 2012, now Pat. No. 9,016,703.

(51) Int. Cl.
*B60G 21/055* (2006.01)
*B60G 7/00* (2006.01)

(52) U.S. Cl.
CPC ........... *B60G 21/055* (2013.01); *B60G 7/001* (2013.01); *B60G 7/008* (2013.01); *B60G 21/0551* (2013.01); *B60G 2200/42* (2013.01); *B60G 2200/422* (2013.01); *B60G 2202/135* (2013.01); *B60G 2202/152* (2013.01);
(Continued)

(58) Field of Classification Search
CPC .... B60G 21/05; B60G 21/051; B60G 21/055; B60G 2202/13; B60G 2202/134; B60G 2202/135; B60G 2202/136; B60G 2202/1362; B60G 2202/152; B60G 7/001; B60G 7/008; B60G 21/0551; B60G 2206/10; B60G 2206/11; B60G 2204/128; B60G 2200/422; B60G 2204/148; B60G 2206/427; B60G 2204/129;
(Continued)

(56) References Cited

U.S. PATENT DOCUMENTS

2,254,261 A 9/1941 Best
2,600,462 A 6/1952 Bateman
(Continued)

*Primary Examiner* — Paul N Dickson
*Assistant Examiner* — Timothy Wilhelm
(74) *Attorney, Agent, or Firm* — Foley & Lardner LLP (57) ABSTRACT

A suspension system for a vehicle having a frame includes a first interface member configured to be positioned on a first lateral side of the frame and a second interface member configured to be positioned on an opposing second lateral side of the frame. The first interface member and the second interface member are positioned along a common central axis. The suspension system also includes a first swing arm coupled to the first interface member and configured to rotate about the common central axis, a second swing arm coupled to the second interface member and configured to rotate about the common central axis, and a sway bar coupled to the first interface member and the second interface member. The sway bar is positioned coaxially with the common central axis and extends between the first swing arm and the second swing arm.

8 Claims, 10 Drawing Sheets

(52) U.S. Cl.
CPC .. *B60G 2204/128* (2013.01); *B60G 2204/129* (2013.01); *B60G 2204/1222* (2013.01); *B60G 2204/1224* (2013.01); *B60G 2204/148* (2013.01); *B60G 2204/41* (2013.01); *B60G 2206/10* (2013.01); *B60G 2206/11* (2013.01); *B60G 2206/427* (2013.01); *B60G 2206/91* (2013.01)

(58) Field of Classification Search
CPC ............ B60G 2204/41; B60G 2200/42; B60G 2204/1224; B60G 2206/91; B60G 2204/1222
See application file for complete search history.

(56) References Cited

U.S. PATENT DOCUMENTS

| | | | | |
|---|---|---|---|---|
| 2,613,954 | A | * | 10/1952 | Avila ................ B60G 5/04 105/198.2 |
| 2,811,347 | A | * | 10/1957 | Cass ................ F16F 1/14 267/277 |
| 2,828,969 | A | * | 4/1958 | Hoffman ................ B60G 7/008 267/273 |
| 2,840,368 | A | | 6/1958 | Chayne et al. |
| 3,085,817 | A | * | 4/1963 | Krause ................ B60G 21/0556 192/85.14 |
| 3,241,620 | A | * | 3/1966 | Brudnak, Jr. ........ A01B 63/112 172/7 |
| 3,397,897 | A | * | 8/1968 | Schultze ................ B60G 13/08 180/9.1 |
| 3,601,426 | A | * | 8/1971 | Hury ................ B60G 3/14 267/221 |
| 3,615,081 | A | * | 10/1971 | Ravenel ................ B60G 11/183 267/279 |
| 3,692,295 | A | | 9/1972 | Cass et al. |
| 3,727,385 | A | * | 4/1973 | Twidale ................ A01D 41/14 56/12.3 |
| 3,778,082 | A | | 12/1973 | Grosseau |
| 3,913,939 | A | * | 10/1975 | Sinclair ................ B60G 21/023 180/9.1 |
| 4,094,532 | A | | 6/1978 | Johnson et al. |
| 4,172,591 | A | * | 10/1979 | Craig ................ B60G 11/20 267/154 |
| 4,234,205 | A | * | 11/1980 | Thiesce ................ B60G 11/183 280/124.107 |
| 4,491,342 | A | | 1/1985 | Aubry |
| 4,544,180 | A | * | 10/1985 | Maru ................ B60G 9/003 280/124.106 |
| 4,625,995 | A | * | 12/1986 | Aubry ................ B60G 21/051 267/148 |
| 4,632,422 | A | | 12/1986 | Csordas et al. |
| 4,883,289 | A | | 11/1989 | Sardou |
| 5,020,783 | A | | 6/1991 | Schroder et al. |
| 5,163,701 | A | | 11/1992 | Cromley, Jr. |
| 5,326,128 | A | | 7/1994 | Cromley, Jr. |
| 5,409,254 | A | * | 4/1995 | Minor ................ B60G 9/003 267/190 |
| 5,520,376 | A | | 5/1996 | Langa et al. |
| 5,687,960 | A | | 11/1997 | Moon |
| 5,934,696 | A | | 8/1999 | Bloser et al. |
| 6,206,391 | B1 | | 3/2001 | Speth et al. |
| 6,447,073 | B1 | * | 9/2002 | Goettker ................ B60B 35/04 267/276 |
| 6,520,494 | B1 | | 2/2003 | Andersen et al. |
| 6,554,305 | B2 | * | 4/2003 | Fulks ................ B60G 17/0277 267/188 |
| 6,634,445 | B2 | * | 10/2003 | Dix ................ B60G 17/005 180/308 |
| 6,869,089 | B2 | * | 3/2005 | Lee ................ B60G 21/05 267/190 |
| 6,976,688 | B2 | | 12/2005 | Archer et al. |
| 7,284,633 | B2 | * | 10/2007 | Bordini ................ B60G 3/12 180/348 |
| 7,566,063 | B2 | * | 7/2009 | Oki ................ B60G 11/183 280/124.106 |
| 7,651,106 | B2 | | 1/2010 | Vortmeyer |
| 7,798,508 | B2 | * | 9/2010 | Wettlaufer, Jr. ..... B60G 21/053 280/124.1 |
| 2011/0011078 | A1 | * | 1/2011 | Kamen ................ F01K 25/00 60/517 |
| 2011/0049818 | A1 | * | 3/2011 | Van der Knaap .... B60G 21/051 280/5.508 |
| 2011/0057066 | A1 | * | 3/2011 | Hayashi ................ B60R 22/4676 242/379.1 |
| 2011/0089658 | A1 | * | 4/2011 | Buhl ................ B60G 17/0277 280/124.106 |
| 2012/0325041 | A1 | * | 12/2012 | Sakuma ................ B62D 1/185 74/493 |
| 2014/0000235 | A1 | * | 1/2014 | Kamen ................ F01K 25/00 60/39.6 |

* cited by examiner

CO-AXIAL SWAY BAR FOR A SUSPENSION SYSTEM

CROSS-REFERENCE TO RELATED PATENT APPLICATIONS

This application is a continuation of U.S. application Ser. No. 13/676,698, filed Nov. 14, 2012, which is incorporated herein by reference in its entirety.

BACKGROUND

The present application generally relates to suspension systems. Specifically, the present application relates to a sway bar that may be used on a trailing arm suspension. Such a sway bar may be located along an axis of rotation for the trailing arms of such a suspension.

A suspension system is used to couple the chassis of a vehicle to a ground surface. Vehicles traveling along a surface (e.g., pavement, asphalt, gravel, earth, sand, etc.) may encounter various driving conditions. A first driving situation is where the vehicle travels over an obstacles or variations. Such obstacles may include rocks, potholes, and curbs, among obstructions, and such variations may include depressions, inclines, and bumps, among other deviations from the surface. Further, a vehicle may encounter a second driving situation where the vehicle is steered aggressively. A vehicle may encounter a third driving situation where the vehicle is steered around a corner having a large radius (i.e., a long and sweeping driving maneuver). Still other driving situations are possible and vary based on the surfaces, speeds, and environment involved.

Suspension systems are designed to at least partially isolate the body of a vehicle during such driving situations. Traditional suspension systems include the MacPherson strut system, the "double A-arm" suspension system, and the trailing arm suspension system, among others. A trailing arm suspension system includes two swing arms that rotate about a pivot axis. Such systems may further include springs, struts, and a sway bar, among other components. A sway bar may be included to couple the opposing sides of a suspension system to encourage movement of one side upon movement of the other. As one side of the suspension receives an input force, the force may be transmitted to the other side by twisting the sway bar. Such twisting and transfer is often accomplished by offsetting the sway bar from the pivot axis using various linkages. Traditional designs often mount the sway bar externally from the suspension system (e.g., on the top of the shock tower) or through other suspension components. Such a sway bar position requires engineers to vary the design of other suspension components, the frame, and the support structure to accommodate the sway bar. Further, sway bars often impact other suspension or chassis components during jounce or rebound, and such impact may limit the potential wheel travel of the suspension system.

Loading and unloading from inputs through the suspension over the life of the sway bar makes sway bars particularly vulnerable to mechanical failure. The surface finish and condition of sway bars impacts the likelihood the sway bar will fail during a period of time. Protecting a sway bar from surface imperfections caused by impacting a surface (e.g., interacting with a curb surface, etc.) or an obstacle (e.g., striking a rock, impacts from road debris, etc.) may improve the life of the sway bar and prevent premature failure. However, traditional sway bar designs often leave the sway bar exposed to road debris and obstacles. Accordingly, a need exists for a suspension system having a sway bar that is protected from road debris and allows for greater wheel travel.

SUMMARY

One embodiment relates to a suspension system for a vehicle having a frame. The suspension system includes a first interface member configured to be positioned on a first lateral side of the frame and a second interface member configured to be positioned on an opposing second lateral side of the frame. The first interface member and the second interface member are positioned along a common central axis. The suspension system also includes a first swing arm coupled to the first interface member and configured to rotate about the common central axis, a second swing arm coupled to the second interface member and configured to rotate about the common central axis, and a sway bar coupled to the first interface member and the second interface member. The sway bar is positioned coaxially with the common central axis and extends between the first swing arm and the second swing arm.

Another embodiment relates to a suspension system for a vehicle having a frame. The suspension system includes a first swing arm configured to be positioned on a first lateral side of the frame, a first interface member coupled to the first swing arm, a second swing arm configured to be positioned on an opposing second lateral side of the frame, a second interface member coupled to the second swing arm, and a torsion spring extending through at least a portion of the first swing arm and at least a portion of the second swing arm. The torsion spring is coupled to the first interface member and the second interface member. The torsion spring is a continuous bar that defines a central axis about which both the first swing arm and the second swing arm rotate.

Still another embodiment relates to a vehicle. The vehicle includes a frame having a first lateral side and a second lateral side, and a suspension system. The suspension system includes a first swing arm positioned on the first lateral side of the frame, a first interface member coupled to the first swing arm, a second swing arm positioned on the second lateral side of the frame, a second interface member coupled to the second swing arm. The sway bar extending through at least a portion of the first swing arm and at least a portion of the second swing arm, and coupled to the first interface member and the second interface member. The sway bar is a continuous element that defines a central axis about which both the first swing arm and the second swing arm rotate.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
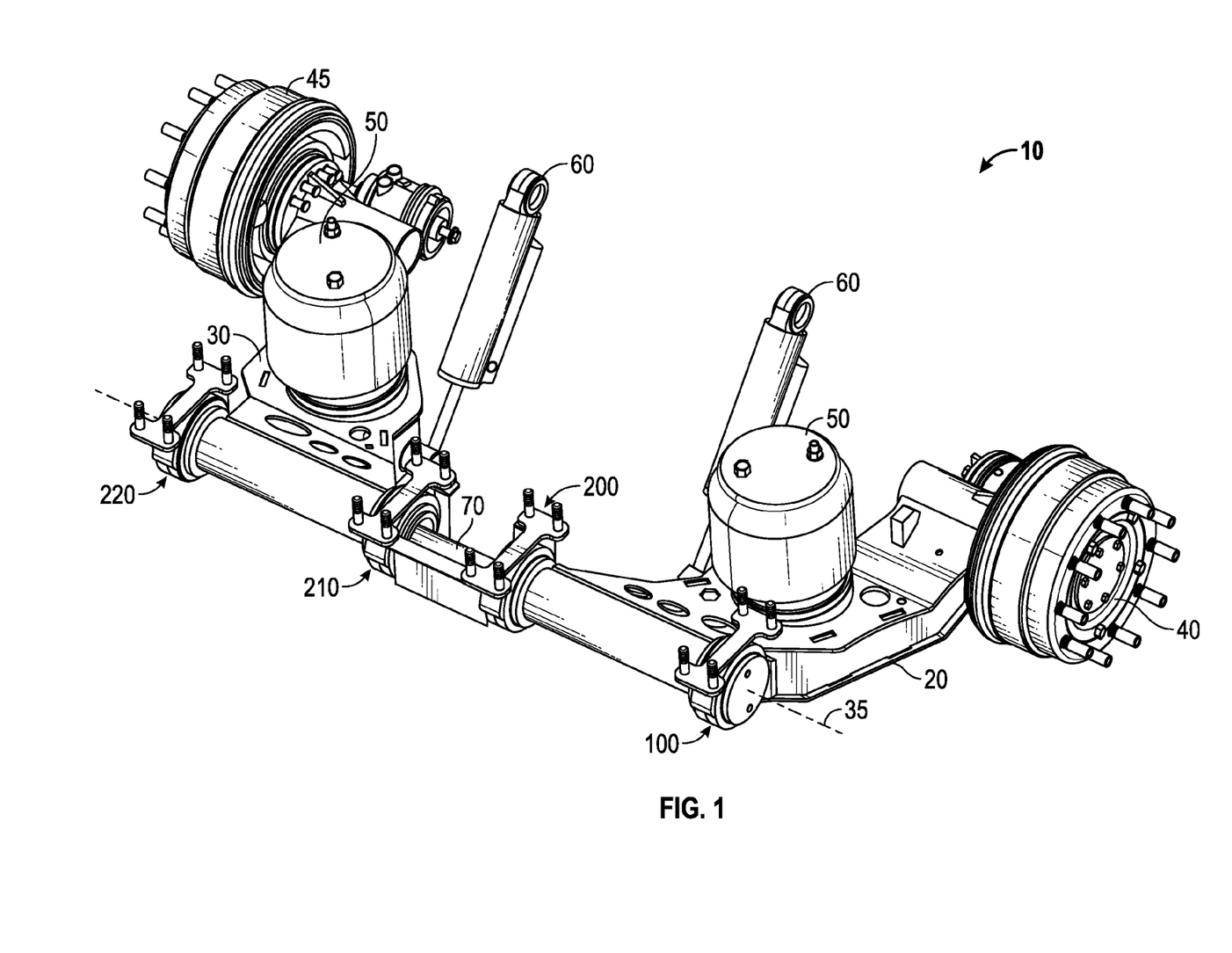
FIG. 1 is an elevation view of a suspension system on a non-driving axle having a coaxial sway bar.

Referring to the exemplary embodiment shown in FIG. 1, a vehicle may include a non-driven axle, shown as suspension assembly 10. Such a vehicle may be an off road truck, a heavy duty truck, a trailer, or other known vehicle designs. Suspension assembly 10 is intended to aid in isolating a vehicle body from forces imparted on the vehicle from a road surface, an obstacle, or another input (e.g., explosion, etc.). Such isolation may include absorbing forces imparted on suspension assembly 10 or may include directing forces within suspension assembly 10 to modify the reaction experienced by the vehicle body. As shown in FIG. 1, suspension assembly 10 includes a first member, shown as first swing arm 20 and a second member, shown as second swing arm 30. First swing arm 20 and second swing arm 30 may be arranged on opposing sides of a vehicle chassis (not shown). According to the exemplary embodiment shown in FIG. 1, first swing arm 20 and second swing arm 30 extend rearward and pivot about an axis, shown as pivot axis 35.

Referring still to the exemplary embodiment shown in FIG. 1, suspension assembly 10 further includes a wheel end, shown as hub 40 coupled to an end of first swing arm 20. Hub 40 is configured to rotate about a centerline and interface with a driven member (e.g., tire, etc.) that couples suspension assembly 10 to a road surface. According to an exemplary embodiment, hub 40 includes various internal components (e.g., bearings, bushings, washers, brake assemblies, etc.) to facilitate the operation of a vehicle or suspension assembly 10.

As shown in FIG. 1, suspension assembly 10 may further include a spring, shown as air bag 50 that supports the sprung mass of the vehicle. According to the exemplary embodiment shown in FIG. 1, air bag 50 has a first end coupled to first swing arm 20 and a second end configured to be coupled to a vehicle chassis. According to various alternative embodiments, air bag 50 may be coupled to another portion of first swing arm 20, suspension assembly 10 may include a plurality springs, such as air bags 50, or suspension assembly 10 may not include a spring, such as air bag 50. Air bag 50 absorbs energy and prevents the vehicle body from experiencing a portion of an input force. Such absorption may occur by allowing for relative movement between the first and second ends of air bag 50. A relative movement between the first and second ends of allows air bag 50 to utilize the energy associated with the input force to compress air within a chamber. According to an alternative embodiment, air bag 50 may comprise a spring or another resilient member that compresses to absorb energy, thereby limiting the amount of energy transferred to the vehicle body.

According to an exemplary embodiment, suspension assembly 10 further includes a damper, shown as strut 60. As shown in FIG. 1, strut 60 has a first end coupled to first swing arm 20 and a second end configured to be coupled to a vehicle chassis. Strut 60 may include internal components that manipulate the response forces generated from an input force. By way of example, such internal components may include a housing coupled to the second end and containing a fluid. The fluid interacts with a plurality of openings within a piston coupled to the first end. As strut 60 receives an input force, the output force imparted on the vehicle chassis is affected by the movement of the piston though the fluid. As shown in FIG. 1, strut 60 may be angled with respect to air bag 50. According to an alternative embodiment, strut 60 may be arranged coaxially with air bag 50 (e.g., configured as a coil-over design). Suspension assembly 10 may include a single strut 60, a plurality of struts 60, or may not include a strut 60.

As shown in FIG. 1, suspension assembly 10 may include a sway bar (e.g., anti-sway bar, torsion spring, roll stability device, etc.), shown as sway bar 70. Sway bar 70 may be shaped in various configurations as a straight member, a member having a curved shape, a member having a plurality of bends, or a member including an assembly of subcomponents. As shown in FIG. 1, sway bar 70 has a circular cross section. According to various alternative embodiments, sway bar 70 may have a square or hexagonal cross section, may comprise a tubular structure, may have a cross section that varies along a length of sway bar 70, or may be comprised of various subcomponents.

While sway bar 70 is shown for clarity in FIG. 1 as partially exposed, suspension assembly 10 may further include a cover (e.g., guard, plate, tube, etc.) configured to protect sway bar 70 from damage by impacts that may occur with debris or obstacles. Protecting sway bar 70 may extend the useable life of sway bar 70 by preventing crack formation or propagation that may lead to fatigue failure. Such a cover may be a tubular structure coupled to first swing arm 20 and second swing arm 30. According to an alternative embodiment, the cover may comprise a boot slidably coupled to sway bar 70. According to still another alternative embodiment, the cover may include a shield coupled to first swing arm 20, second swing arm 30, or another component of suspension assembly 10.

According to the exemplary embodiment shown in FIG. 1, sway bar 70 is positioned along the length of pivot axis 35 and at least partially within first swing arm 20 and second swing arm 30. Locating sway bar 70 along pivot axis 35 may provide the advantage of further protecting sway bar 70 from damage by impacts that may occur with debris or obstacles. Locating sway bar 70 along pivot axis 35 may provide the further advantage of improving the wheel travel of suspension assembly 10 because sway bar 70 may not interfere with other components of suspension assembly 10.

According to the exemplary embodiment shown in FIG. 1, suspension assembly 10 includes a first coupler (e.g., connector, pivot, etc.), shown as first joint 100, a second coupler (e.g., connector, pivot, etc.), shown as second joint 200, a third coupler (e.g., connector, pivot, etc.), shown as third joint 210, and a fourth coupler (e.g., connector, pivot, etc.), shown as fourth joint 220. As shown in FIG. 1, first joint 100 and second joint 200 may be coupled to an end of first swing arm 20 and configured to facilitate rotation of first swing arm 20 about pivot axis 35. Similarly, third joint 210 and fourth joint 220 may be coupled to an end of second swing arm 30 and configured to facilitate the rotation of second swing arm 30 about pivot axis 35.

Figure 2:
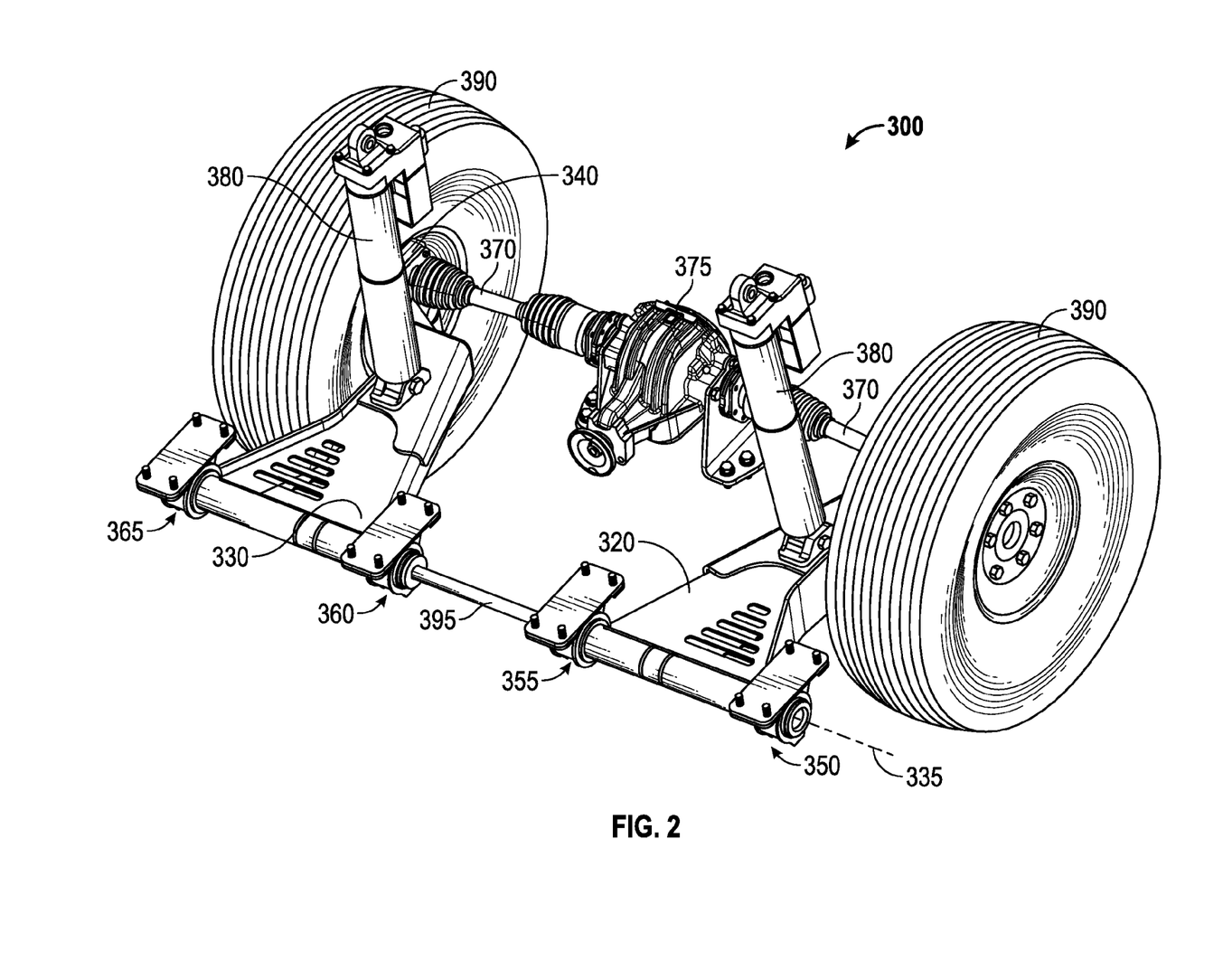
FIG. 2 is an elevation view of a suspension system on a driving axle having a coaxial sway bar.

Referring next to the exemplary embodiment shown in FIG. 2, a vehicle may include an axle assembly, shown as driven axle 300. Such a vehicle may include an off road truck, a heavy duty truck, or other known vehicle designs. Driven axle 300 may isolate a vehicle body from forces imparted on the vehicle from a road surface, an obstacle, or another input (e.g., explosion, etc.) and also provide a motive force to propel the vehicle. Further, driven axle 300 may receive an input from a powering device (e.g., motor, engine, etc.) or may further include a powering device coupled a portion of driven axle 300.

As shown in FIG. 2, driven axle 300 includes a first member, shown as first swing arm 320 and a second member, shown as second swing arm 330. First swing arm 320 and second swing arm 330 rotate about a common axis, shown pivot axis 335. Such rotation is facilitated by a first coupler, shown as first joint 350, a second coupler, shown as second joint 355, a third coupler, shown as third joint 360, and a fourth coupler, shown as fourth joint 365. According to an exemplary embodiment, joints 350, 355, 360, and 365 further couple first swing arm 320 and second swing arm 330 to a chassis of a vehicle. As shown in FIG. 2, driven axle 300 further includes a resilient member, shown as strut 380 configured to affect the forces imparted by driven axle 300 on a vehicle body in response to an input force and a roll stability member, shown as sway bar 395 configured to couple the opposing sides of driven axle 300. According to an exemplary embodiment, driven axle 300 further includes a gear train, shown as differential 375 coupled to an end of drive axles, shown as half shafts 370. As shown in FIG. 2, an end of half shafts 370 may interface with a wheel end, shown as hub 340. Hub 340 may be coupled to first swing arm 320 or second swing arm 330 and a driven member, shown as tire 390. According to an exemplary embodiment, such coupling may allow driven axle 300 to rotate tires 390 in response to a torque input received by differential 375.

Figure 3:
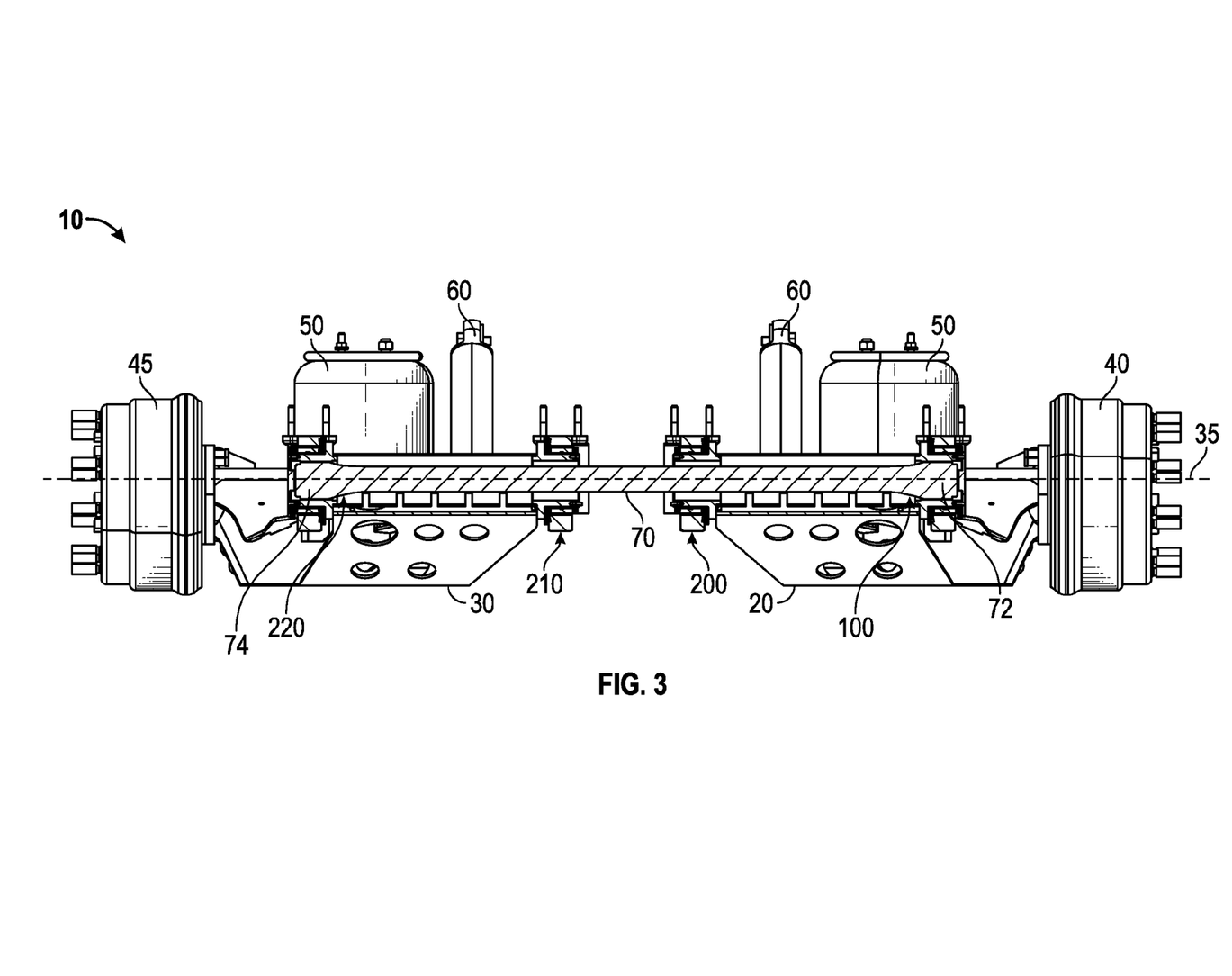
FIG. 3 is a cross sectional view of a suspension system having a coaxial sway bar.
Figure 4:
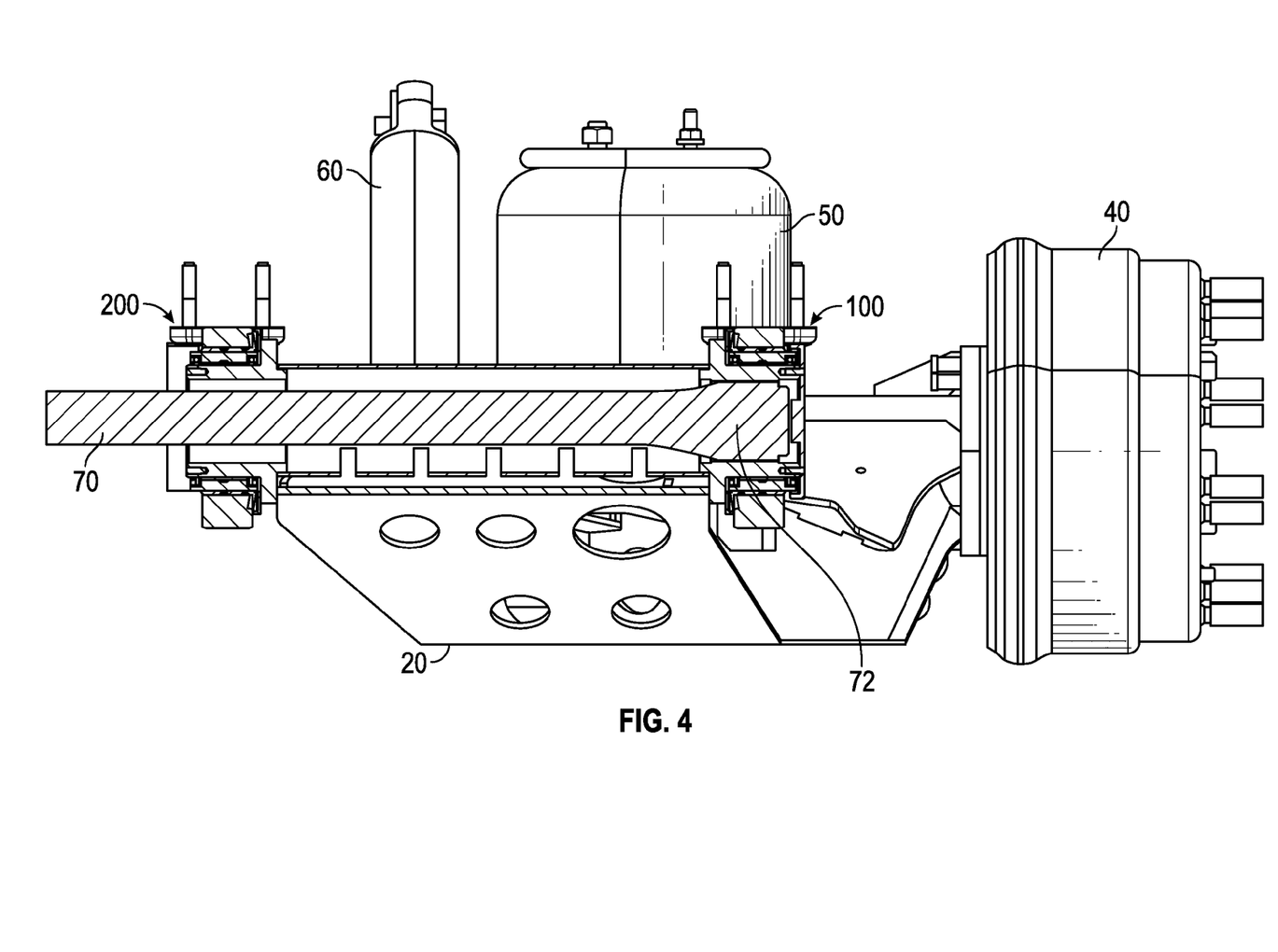
FIG. 4 is a cross sectional view of a suspension system having a coaxial sway bar.

Referring next to FIGS. 3-4, a cross section of suspension assembly 10 is shown, according to an exemplary embodiment. As shown in FIG. 3, sway bar 70 extends laterally within suspension assembly 10 and includes a first end 72 and a second end 74. According to an exemplary embodiment, first end 72 of sway bar 70 may be coupled to first swing arm 20 at first joint 100, sway bar 70 may extend through second joint 200 and third joint 210, and second end 74 of sway bar 70 may be coupled to second swing arm 30 at fourth joint 220. According to an alternative embodiment, sway bar 70 is coupled to first swing arm 20 and second swing arm 30 at second joint 200 and third joint 210, at other points along pivot axis 35, or at other locations on first swing arm 20 and second swing arm 30.

Referring still to FIGS. 3-4, sway bar 70 couples the two sides of suspension assembly 10. Such coupling may provide various advantages depending on the driving conditions encountered. A first driving condition occurs as the tire of a vehicle impacts an obstacle or variation. Such obstacles may include rocks, potholes, and curbs, among other obstructions, and such variations may include depressions, inclines, and bumps, among other deviations from the surface. A tire may be coupled to hub 40 along first swing arm 20, and as the tire encounters the obstacle or variation, a force is transmitted through hub 40 and into first swing arm 20. Absent sway bar 70, first swing arm 20 may rotate about pivot axis 35 independent of second swing arm 30. Such independent movement may cause first swing arm 20 to rotate upward and cause the vehicle chassis to roll. By way of example, the vehicle chassis may roll upward and away from first swing arm 20 (i.e. counter clockwise about a length of the vehicle from a front view) as hub 40 moves upward or the vehicle chassis may roll downward and towards first swing arm 20 (i.e. clockwise about a length of the vehicle from a front view) as hub 40 moves downward.

Referring still to FIGS. 3-4, installing sway bar 70 may impact the performance of the vehicle during the first driving condition. A suspension assembly 10 including sway bar 70 may roll less compared to a suspension system having decoupled swing arms. As a tire impacts an obstacle or variation, an input force having a magnitude and direction may be transmitted through hub 40 and interact with first swing arm 20 and the vehicle chassis. The input force creates a turning torque upon sway bar 70 at the points where sway bar 70 is coupled to first swing arm 20, and this turning torque is transmitted to the opposite end of sway bar 70. Such a turning torque may act to rotate second swing arm 30 thereby causing second hub 45 to rotate upward along an arced path. According to an exemplary embodiment, sway bar 70 may comprise a resilient member that twists to absorb a portion of the input energy thereby contributing to the spring rate of the suspension. Sway bar 70 may also twist to allow for relative movement between the opposing wheel hubs. Such upward movement and torque acting on second swing arm 30 may impart a second force upon the vehicle chassis. This second force acts against the input force to counteract body roll about a centerline of the vehicle thereby reducing the amount of body roll experienced in response to a tire impacting an obstacle or variation.

Referring still to FIGS. 3-4, a second and third driving condition may occur where the vehicle is steered aggressively or steered around a corner having a large radius. Either of these driving conditions causes a body roll opposite the steering direction (e.g., a turn to the right creates body roll to the left, etc.) as the vehicle mass acts about a center of gravity for the vehicle. A decoupled suspension system without a sway bar may not be able to correct for such body roll. As discussed above, a force applied on first swing arm 20 may be transmitted as torque through sway bar 70 thereby creating an opposing force on second swing arm 30 that resists body roll.

Figure 5:
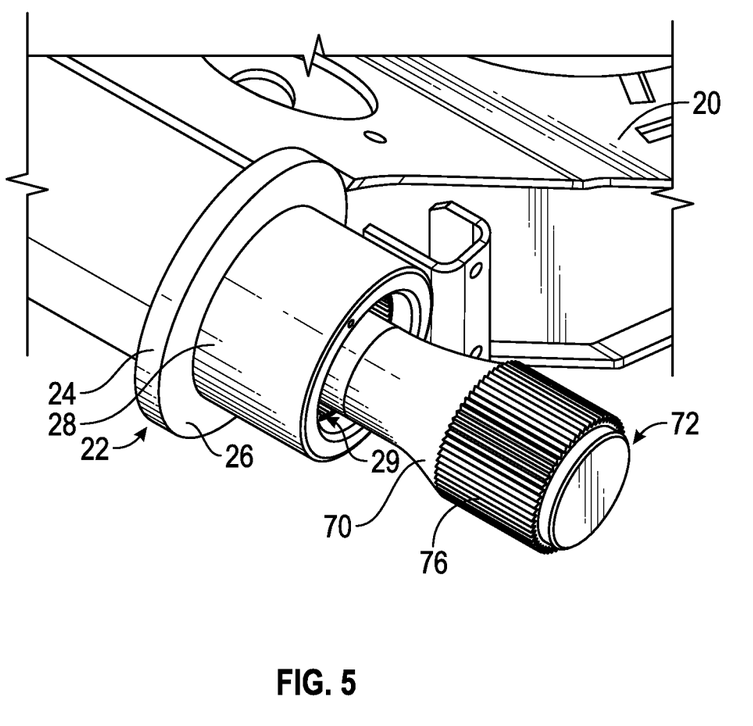
FIG. 5 is an elevation view of one joint within a suspension system having a coaxial sway bar.
Figure 6:
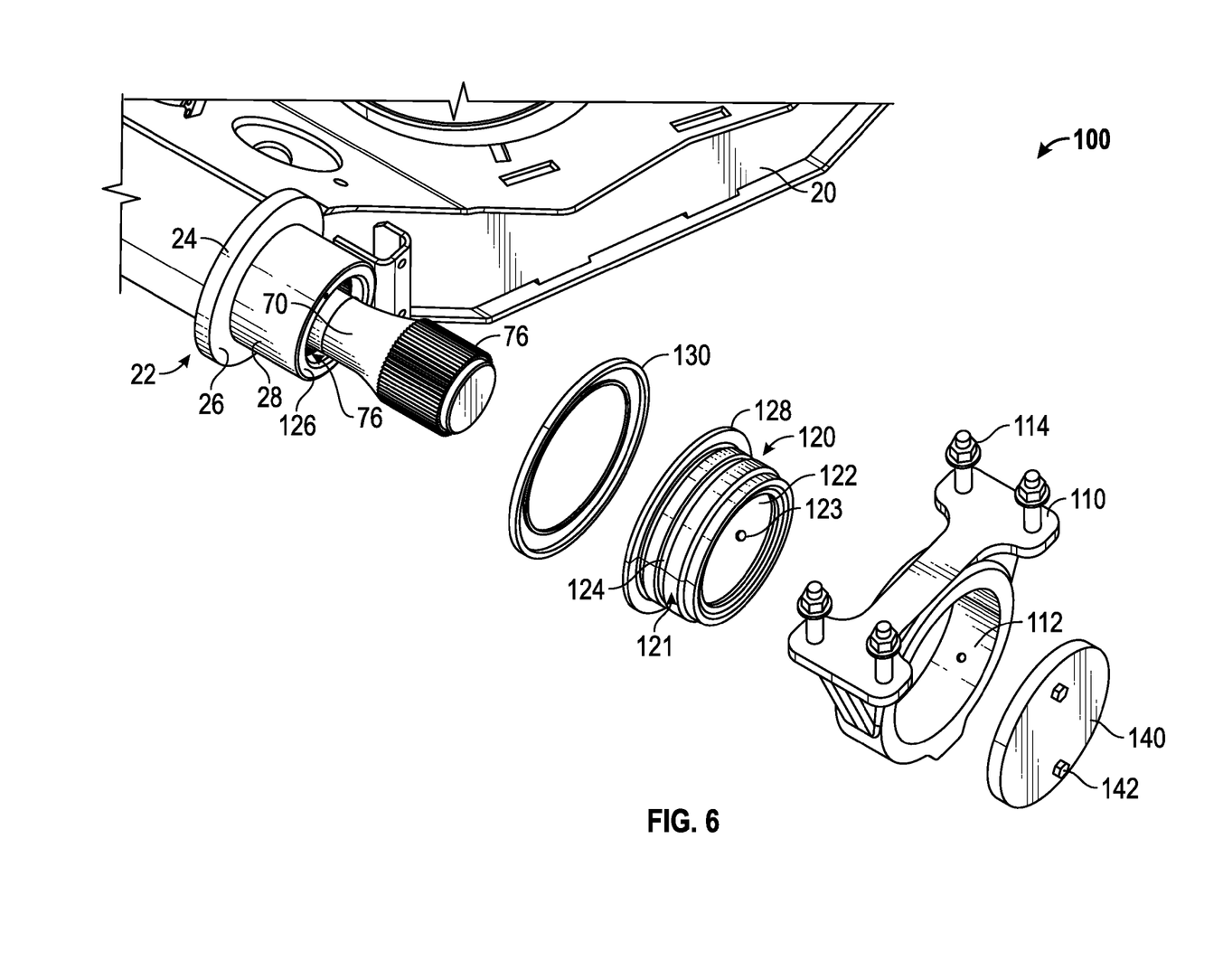
FIG. 6 is an elevation view of one joint assembly within a suspension system having a coaxial sway bar.
Figure 7:
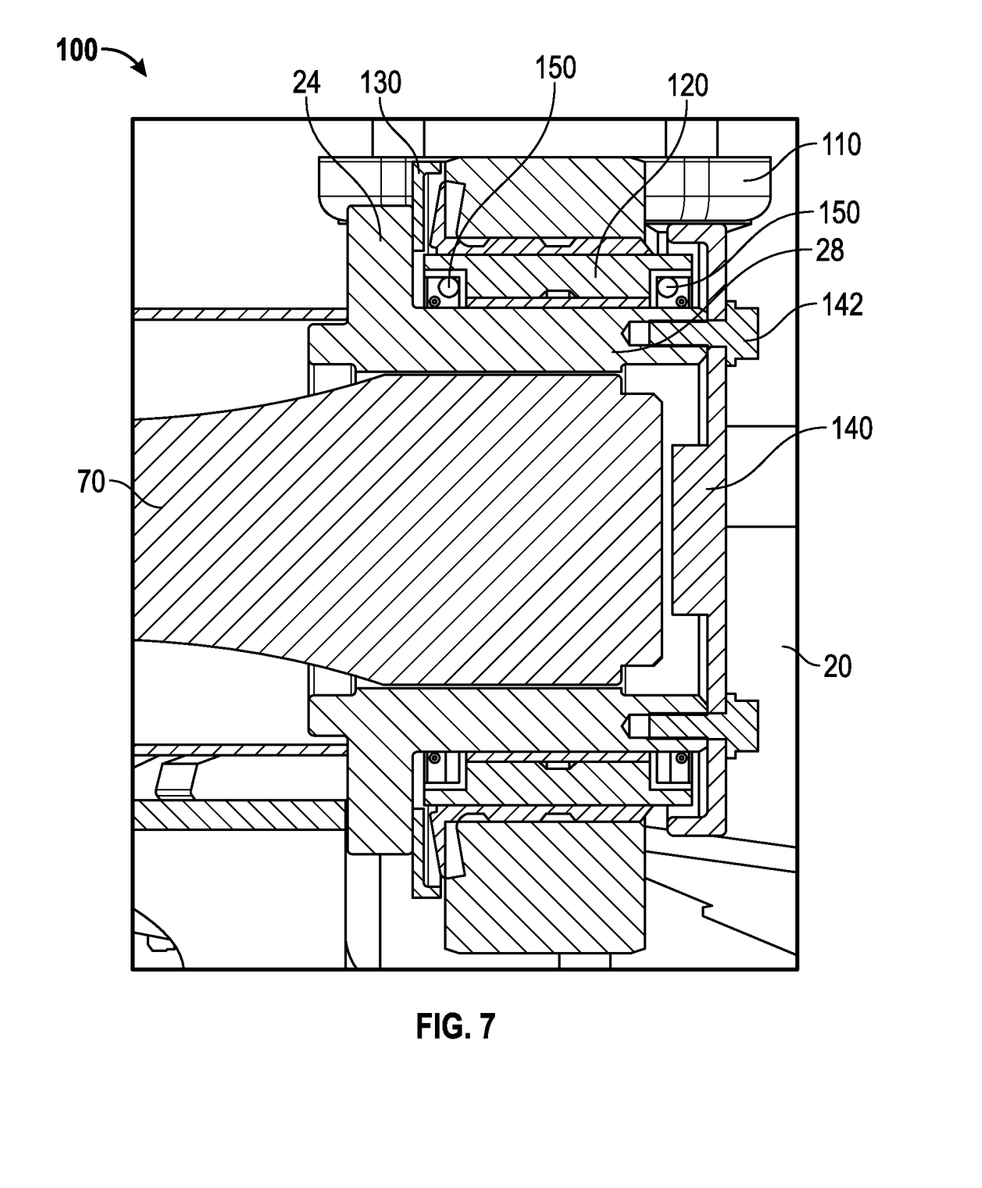
FIG. 7 is a cross sectional view of one joint assembly within a suspension system having a coaxial sway bar.

Referring next to FIGS. 5-7, sway bar 70 is shown coupled to first swing arm 20, according to an exemplary embodiment. Such coupling may facilitate a reduction in body roll, as discussed above. According to an exemplary embodiment, sway bar 70 may be coupled to first swing arm 20 proximate first end 72. According to an alternative embodiment, sway bar 70 is coupled to first swing arm 20 at another location along the length of sway bar 70. As shown in FIG. 5, sway bar 70 includes an interface, shown as splined end 76 proximate first end 72. Splined end 76 engages an interface portion, shown as splined receiver 29 that is coupled to first swing arm 20. Such engagement may interlock the movement of first swing arm 20 and sway bar 70. According to an alternative embodiment, sway bar 70 may be coupled to first swing arm 20 using another known method (e.g., welding, a bolted connection, a press fit connection, thermal fit connection, etc.).

According to an exemplary embodiment, splined end 76 that interfaces with first swing arm 20 may differ from the opposing interface that couples second end 74 of sway bar 70 to second swing arm 30. According to an exemplary embodiment, the interface at second end 74 of sway bar 70 may also include a splined connection. Splined end 76 may have a different diameter or number of teeth, among other differences, than the interface at the second end 74 of sway bar 70. According to an exemplary embodiment, such variation may facilitate the manufacture, assembly, and maintenance of suspension assembly 10.

During the manufacture of first swing arm 20 and second swing arm 30, splined receiver 29 may be coupled (e.g., bolted, welded, pressed into, etc.) to an end of first swing arm 20. According to an exemplary embodiment, such splined receiver 29 is received into an end of first swing arm 20 and welded into place. A similar opposing splined portion may be received into an end of second swing arm 30. Rotationally locating splined receiver 29 (i.e. orienting splined receiver 29 about pivot axis 35 relative to a similar splined portion proximate second end 74) may prove difficult for a suspension system where splined end 76 and the similar splined portion proximate second end 74 have the same number of teeth. Such a system would require alignment of the teeth of splined receiver 29 and a corresponding splined receiver proximate second end 74 because misalignment may prevent proper assembly of suspension assembly 10.

According to an exemplary embodiment, varying the number of teeth between splined receiver 29 and a corresponding splined receiver proximate second end 74 facilitates assembly by providing for allowed misalignment. During assembly, a user may slide sway bar 70 into a splined receiver proximate second end 74 and determine whether the teeth of splined end 76 are aligned with the mating recesses within splined receiver 29. Where the teeth of splined end 76 are not aligned with the recesses of splined receiver 29, the user may slide sway bar 70 partially out and index the splined portion proximate second end 74 within the opposing splined receiver and again check for alignment of the teeth of splined end 76 and the recesses within splined receiver 29. According to an exemplary embodiment, such indexing allowed by the different number of teeth may allow a user to slide sway bar 70 into splined receiver 29 and the opposing splined receiver with minimal interference (e.g. slide in easily, slide in with slight tapping, etc.). According to an exemplary embodiment, a varied number of teeth allows for between 0.5 and 3.0 degrees of misalignment between the recesses of splined receiver 29 and the recesses within the corresponding receiver proximate second end 74.

According to an alternative embodiment, misalignment between the teeth of splined end 76 and the similar splined portion proximate second end 74 may be accommodated during the assembly process of suspension assembly 10. By way of example, a user may assemble suspension assembly 10 by sliding second end 74 of sway bar 70 through first joint 100, second joint 200, third joint 210, and fourth joint 220 and into a splined receiver. The user may then check the alignment between the teeth of splined end 76 and the recesses of splined receiver 29. Where the teeth and recesses are misaligned, a user may rotate second swing arm 30 until the teeth of splined end 76 are aligned with the recesses of splined receiver 29. By way of example, rotation of second swing arm 30 during assembly may be accomplished by lifting the sprung weight of the vehicle. Such an assembly process may cause first swing arm 20 to be rotationally offset from second swing arm 30. The weight a vehicle positioned above suspension assembly 10 may force both tires to contact the ground surface thereby rotationally aligning first swing arm 20 and second swing arm 30. Such forced alignment may impart a preload torque onto sway bar 70 and produce a suspension having a different spring rate. According to an exemplary embodiment, a user may adjust the preload torque either during initial assembly or in the field by offsetting first swing arm 20 relative to second swing arm 30. According to an exemplary embodiment, the process of adding a preload torque to sway bar 70 may be used to replace or supplement the allowed misalignment provided by specifying a different number of teeth for splined end 76 and the similar splined portion proximate second end 74.

According to an exemplary embodiment, splined receiver 29 has a different diameter than the opposing interface portion. By way of example, the opposing interface portion may have a diameter that is smaller than splined receiver 29. According to an exemplary embodiment, such variance in diameter allows for a user to assemble suspension assembly 10 by inserting sway bar 70 in from one side of suspension assembly 10. Due to the smaller diameter, a user may slide second end 74 through splined receiver 29 and into the opposing splined receiver. A different diameter also facilitates maintenance because a user may remove sway bar 70 without disassembling both sides of suspension assembly 10. By way of example, a user may disassemble the side of suspension assembly 10 proximate first swing arm 20 and slide sway bar 70 outward without needing to disassemble the side of suspension assembly 10 proximate second swing arm 30. Such maintenance benefits may be especially important to reduce maintenance costs or to increase maintenance efficiency in hostile environments.

Referring again to FIGS. 5-7, first swing arm 20 may further include a first coupler, shown as first joint end 22, according to an exemplary embodiment. First joint end 22 may be coupled to first swing arm 20 or may be integrally formed with first swing arm 20. As shown in FIG. 5, first joint end 22 may include an extended portion, shown as flange 24. According to an exemplary embodiment, flange 24 limits the movement of first swing arm 20 along pivot axis 35. First joint end 22 further includes a projection, shown as cylinder 28. As shown in FIGS. 5-7, cylinder 28 may be welded to first swing arm 20. According to an alternative embodiment, cylinder 28 may be integrally formed with or otherwise fastened to first swing arm 20. Cylinder 28 may have a tubular cross section, a rectangular cross section, or any other suitable shape. As shown in FIG. 5, splined receiver 29 may be coupled to (e.g., integrally formed, welded, bolted, etc.) cylinder 28, and cylinder 28 may be coaxial with splined receiver 29. Flange 24 may include an outer surface, shown as surface 26 extending from cylinder 28.

Referring to FIG. 6, first joint 100 is shown, according to an exemplary embodiment. As shown in FIG. 6, first joint 100 may include a support, shown as bracket 110. Bracket 110 may couple suspension assembly 10 to the chassis of a vehicle. Such coupling may occur through the use of fasteners, shown as bolts 114. According to various alternative embodiments, bracket 110 may be coupled to the chassis of a vehicle using another known fastening connection (e.g., welding, a composite interface, etc.). Bracket 110 may include an inner surface, shown as outer race surface 112. Outer race surface 112 may be hardened to resist wear imparted by forces transmitted through first joint 100.

According to the exemplary embodiment shown in FIG. 6, first joint 100 further includes an inner rotatable member, shown as bushing 120. As shown in FIG. 6, bushing 120 may be shaped as a tubular member. Bushing 120 may include an outer bearing surface, shown as outer bushing surface 121 that is configured to be received by outer race surface 112. As shown in FIG. 6, bushing 120 may further include an inner bearing surface, shown as inner bushing surface 122. According to an exemplary embodiment, inner bushing surface may be configured to receive an outer surface of cylinder 28. Relative movement between outer bushing surface 121 and outer race surface 112 and inner bushing surface 122 and cylinder 28 may be facilitated by a lubricant (e.g., oil, a synthetic material, grease, etc.). Such a lubricant may be disposed within a channel, shown as groove 124. As shown in FIG. 6, groove 124 is positioned circumferentially along outer bushing surface 121. According to an exemplary embodiment, bushing 120 further includes an opening, shown as aperture 123. Aperture 123 may facilitate the flow of the lubricant into the interface of inner bushing surface 122 and cylinder 28.

According to the exemplary embodiment shown in FIG. 6, first joint 100 further includes a washer bearing, shown as thrust washer 130. As shown in FIG. 6, thrust washer 130 is sandwiched between surface 26 of flange 24 and an extended portion of bushing 120, shown as flange 128. Thrust washer 130 is intended to reduce the axial side loads experienced by the various other components of first joint 100 during the operation of suspension assembly 10. By way of example, such side loads may occur during cornering of the vehicle. Thrust washer 130 may comprise various materials and may be designed to wear in advance of surface 26 or flange 128. According to an exemplary embodiment, thrust washer 130 may be made of a polymeric material. According to an alternative embodiment, thrust washer 130 may be made of a metal (e.g., brass, steel, etc.).

As shown in FIG. 6, first joint 100 may further include a cover, shown as end cap 140. End cap 140 may be made of a variety of known materials (e.g., steel, a polymer, etc.). As shown in FIG. 6, end cap 140 may be positioned proximate the outside of first joint 100. It should be understood that fourth joint 220 may also include a similar end cap 140 positioned proximate the outside of fourth joint 220. End cap 140 may include a plurality of apertures and couplers, shown as fasteners 142. As shown in FIG. 6, fasteners 142 may be received by corresponding openings, shown as apertures 126 within the end of cylinder 28. According to an exemplary embodiment, end cap 140 may prevent debris from entering first joint 100. According to an alternative embodiment, end cap 140 may limit the movement of sway bar 70 along pivot axis 35.

As shown in FIGS. 6-7, outer bushing surface 121 may be rotatably coupled to outer race surface 112, and inner bushing surface 122 may be rotatably coupled to an outer surface of cylinder 28. According to an exemplary embodiment, cylinder 28 may rotate relative to bracket 110 and bushing 120 after first swing arm 20 receives an input from hub 40. According to an alternative embodiment, cylinder 28 may rotate with bushing 120 relative to bracket 110. According to still another alternative embodiment, relative movement among cylinder 28, bracket 110, and bushing 120 may occur. Such relative movement may be facilitated by a lubricant, as discussed above. As shown in FIG. 7, the lubricant may be contained within first joint 100 with a resilient member, shown as seal 150. According to an exemplary embodiment, seal 150 is positioned (e.g., pressed into, etc.) within bushing 120 and interfaces with an outer surface of cylinder 28. Seal 150 may also prevent debris from entering first joint 100 and interfering with the relative movement between bushing 120 and cylinder 28.

While the preceding discussion identified the various components of first joint 100, according to an exemplary embodiment, it should be understood that second joint 200, third joint 210, and fourth joint 220 may comprise similar components. Such similar components may include a support and an inner rotatable member coupled to corresponding cylinders. However, second joint 200, third joint 210, and fourth joint 220 may comprise additional components.

According to an alternative embodiment, first joint 100 may comprise a bearing to rotatably couple first swing arm 20 to the chassis of the vehicle. By way of example, such a bearing may include a roller bearing having an inner race, an outer race, and a plurality of spheres disposed between the inner race and the outer race. Such a system may further include a thrust washer configured to limit the axial forces experienced by the roller bearing. According to an alternative embodiment, first joint may comprise a tapered roller bearing having a plurality of angled rollers disposed between an inner and an outer race. According to still other alternative embodiments, first joint 100 may include other known couplers that allow for relative movement between first swing arm 20 or second swing arm 30 and the chassis of a vehicle.

Figure 8:
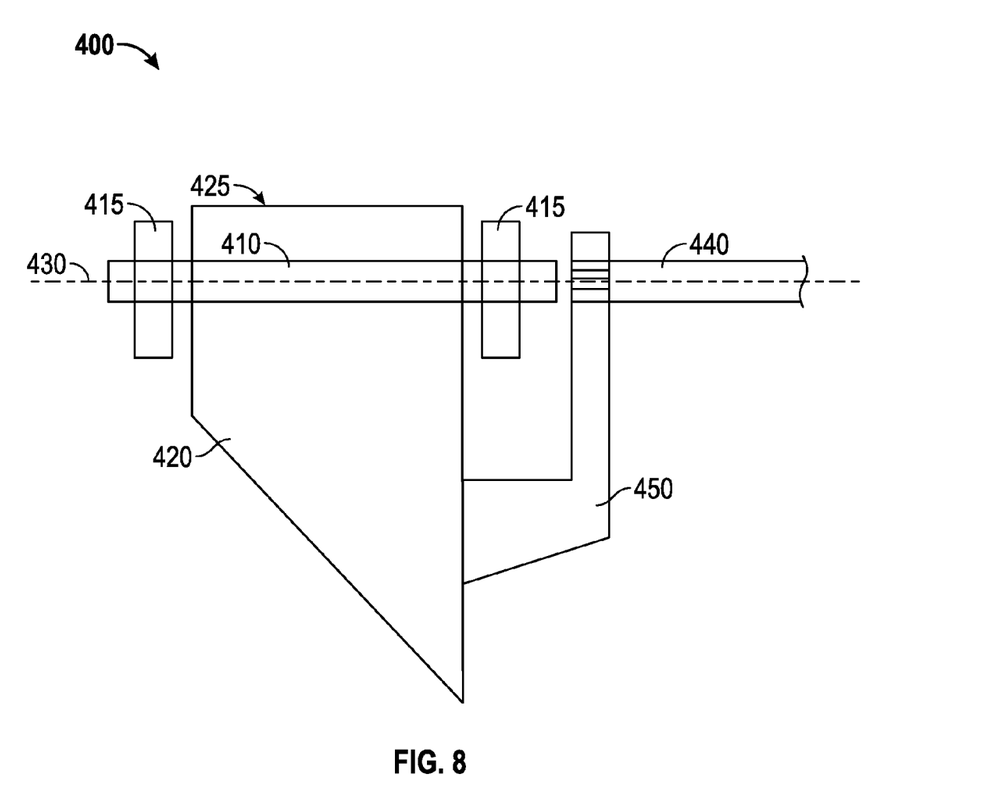
FIG. 8 is a schematic view of a suspension system on a non-driving axle having a coaxial sway bar.

Referring next to an alternative embodiment shown in FIG. 8, a stiffener assembly, shown as control arm assembly 400 includes a first member, shown as first swing arm 420. As shown in FIG. 8, control arm assembly 400 includes pin, shown as pivot 410 and a plurality of couplers, shown as joints 415. Pivot 410 facilitates rotation of first swing arm 420 about an axis, shown as pivot axis 430. Joints 415 rotatably couples first swing arm 420 to the chassis of a vehicle. By way of example, joints 415 may include various known couplers (e.g., roller bearings, tapered roller bearings, bushings, thrust bearings, etc.).

As shown in FIG. 8, first swing arm 420 may be coupled to pivot 410 proximate a first end, shown as pivot end 425. According to an exemplary embodiment, such coupling may occur directly between first swing arm 420 and pivot 410 (e.g., with a bushing, bearing, etc. positioned between first swing arm 420 and pivot 410). According to an alternative embodiment, first swing arm 420 may be coupled to pivot 410 through joints 415. By way of example, such a configuration may involve coupling first swing arm 420 to an outer race of joint 415 and coupling an inner race of joint 415 to pivot 410. The sprung weight (i.e., the weight of the body supported by the suspension) may also be coupled to pivot 410 with additional couplers.

Referring still to FIG. 8, first swing arm 420 may be coupled to a wheel hub and tire assembly (not shown), according to an exemplary embodiment. As a vehicle travels along a surface, various obstacles or variations may result in forces to be transmitted through first swing arm 420 and into the various additional components of control arm assembly 400. Such a vehicle may include a second stiffener assembly that may comprise a mirror image of first swing arm 420, joints 415 and pivot 410. As shown in FIG. 8, control arm assembly 400 may include a roll stability device, shown as sway bar 440. According to an exemplary embodiment, sway bar 440 may be positioned along pivot axis 430. As shown in FIG. 8, sway bar 440 may be coupled to first swing arm 420 with a support, shown as mounting arm 450. The interface between sway bar 440 and mounting arm 450 and mounting arm 450 and first swing arm 420 may take various forms (e.g., integrally formed, welded, press fit, thermally fit, bolted, splined, etc.). According to an exemplary embodiment, sway bar 440 may couple the opposing sides of a vehicle in a manner that provides numerous advantages, such as those discussed above.

Figure 9:
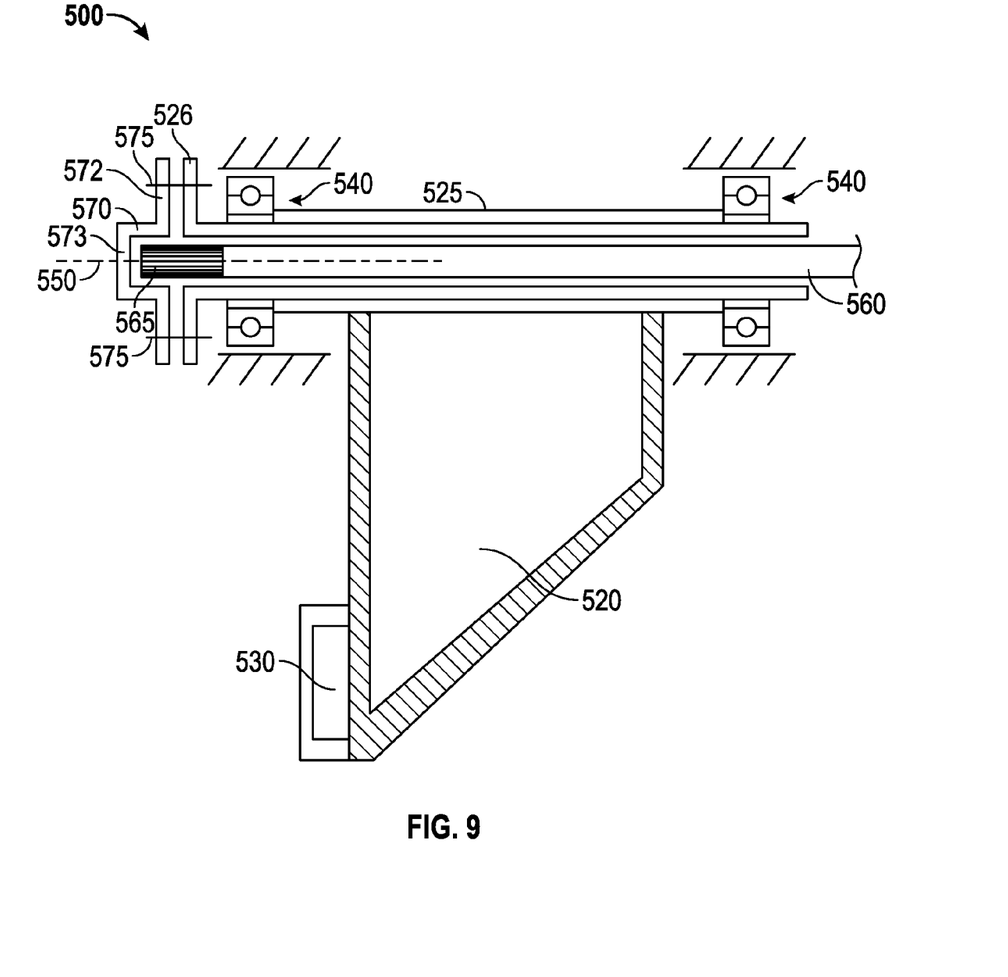
FIG. 9 is a schematic view of a suspension system on a non-driving axle having a coaxial sway bar.

Referring next to the alternative embodiment shown in FIG. 9, a stiffener assembly, shown as control arm assembly 500, includes a first member, shown as first swing arm 520. First swing arm 520 is coupled at a first end to a wheel end, shown as hub 530 that may interface with a tire or another known member capable of supporting at least a portion of a vehicle (e.g., track, etc.). According to an exemplary embodiment, first swing arm 520 is coupled to a vehicle chassis through a plurality of couplers, shown as joints 540. As shown in FIG. 9, joints 540 may comprise roller bearings. According to an alternative embodiment, joints 540 may comprise bushings. According to various other alternative embodiments, joints 540 may comprise tapered roller bearings, thrust bearings, or other known couplers capable of allowing rotational movement between first swing arm 520 and the vehicle chassis.

As shown in FIG. 9, first swing arm 520 is coupled to in inner race of joint 540 through an interfacing member, shown as tube 525. Such a configuration allows first swing arm 520 to rotate about a central axis, shown as pivot axis 550 as first swing arm 520 receives input forces from hub 530. According to an exemplary embodiment, joints 540 and tube 525 include centerlines disposed along pivot axis 550.

According to the exemplary embodiment shown in FIG. 9, control arm assembly 500 may further include a roll stability device, shown as sway bar 560. As shown in FIG. 9, sway bar 560 may be positioned within control arm assembly 500 such that an axis of ration of sway bar 560 may be coaxial with pivot axis 550. According to an exemplary embodiment, tube 525 may further include a projection, shown as flange 526. Flange 526 may be integrally formed with tube 525 or may be coupled with tube 525 (e.g. welded, press fit, etc.). As shown in FIG. 9, control arm assembly 500 may further include a cover, shown as end cap 570 coupled to flange 526 with fasteners, shown as bolts 575. While FIG. 9 shows sway bar 560 extending past the entire length of first swing arm 520, it should be understood that sway bar 560 may be coupled to first swing arm 520 at any location across first swing arm 520, at a location outside (i.e. further from a centerline of the vehicle) of joints 540, or at a location inside (i.e. closer to a centerline of the vehicle) of joints 540, among other configurations.

As shown in FIG. 9, sway bar 560 includes an interfacing portion, showed as spline 565, proximate a first end of sway bar 560. According to an exemplary embodiment, end cap 570 includes a corresponding splined portion disposed within a hollow projection, shown as protrusion 573 that is configured to receive spline 565. A vehicle may include a second control arm, joints, and end cap coupled to a second end of sway bar 560. By way of example, the second control arm, joints, and end cap may be arranged in a configuration that mirrors that of control arm assembly 500. According to an exemplary embodiment, first swing arm 520 experiences a force proximate hub 530 and impart a turning torque on tube 525 and flange 526. Such a turning torque may be transmitted through bolts 575 and spline 565 and into sway bar 560, which may transmit that turning torque to the opposing side of the vehicle. According to an exemplary embodiment, sway bar 560 may couple the opposing sides of a vehicle in a manner that provides numerous advantages, such as those discussed above with respect to sway bar 70.

Figure 10:
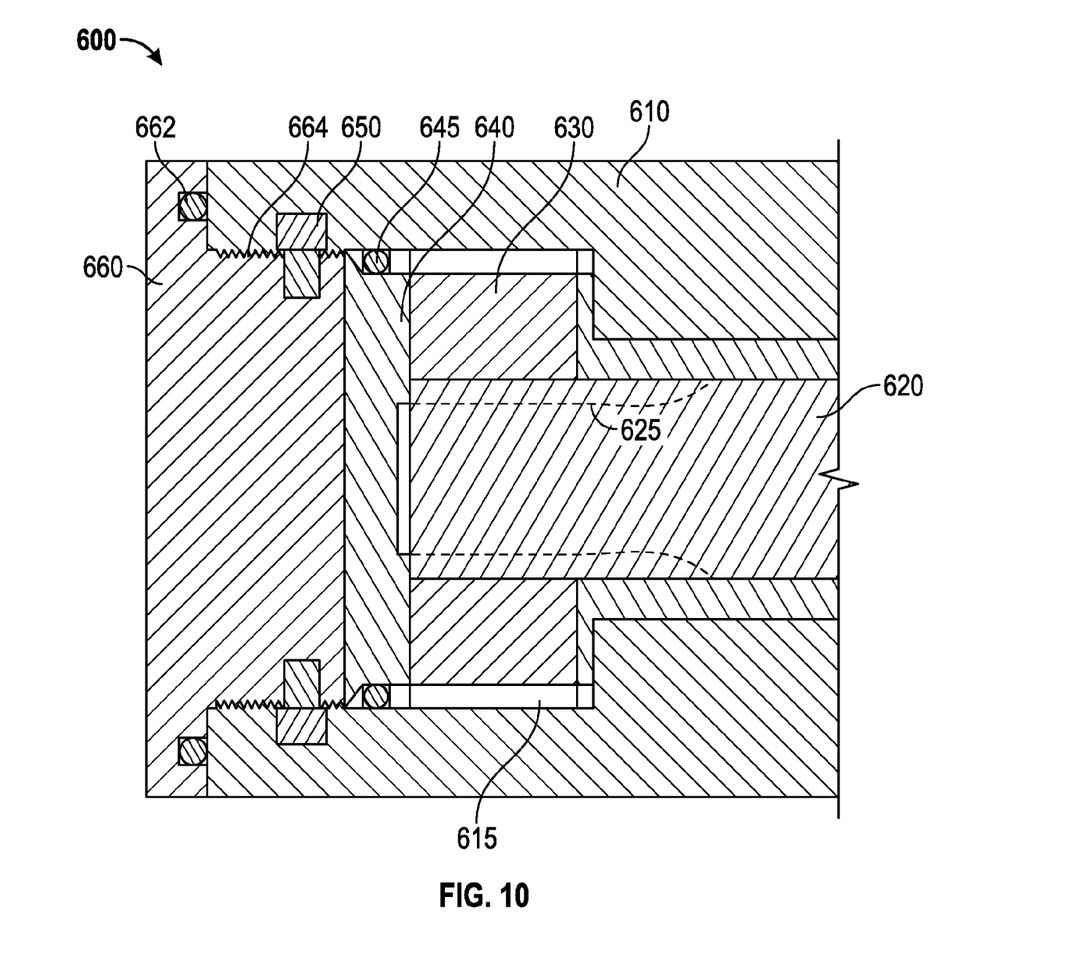
FIG. 10 is a cross sectional view of a coupling for a coaxial sway bar.

Referring next to the alternative embodiment shown in FIG. 10, an interfacing portion, shown as coupling 600 includes an outer support, shown as tube 610 and a roll stability device, shown as sway bar 620. According to an exemplary embodiment, tube 610 is coupled to a swing arm and a vehicle chassis according to the various methods discussed above. As shown in FIG. 10, coupling 600 further includes an interface, shown as ring 630. Ring 630 may be made from various known materials and may be configured to rotatably couple sway bar 620 with tube 610. Such coupling may occur though a first interface between tube 610 and ring 630, shown as first splined connection 615 and a second interface between sway bar 620 and ring 630, shown as second splined connection 625. According to an alternative embodiment, tube 610 and sway bar 620 may be coupled to ring 630 with another known method (e.g., press fit, thermally fit, a keyed connection, etc.).

As shown in FIG. 10, coupling 600 further includes a stopping plate, shown as limiter 640. According to an exemplary embodiment, limiter 640 prevents ring 630 from sliding within tube 610. According to another embodiment, coupling 600 may not include limiter 640. As shown in FIG. 10, limiter 640 further includes a washer, shown as seal 645 that is configured to prevent debris from contacting ring 630 or sway bar 620. According to the exemplary embodiment shown in FIG. 10, coupling 600 further includes a fastener, shown as snap ring 650 to secure limiter 640 within tube 610. According to an alternative embodiment, coupling 600 may not include a fastener, and limiter 640 may be otherwise secured within tube 610 (e.g., with a threaded connection, etc.).

Referring still to FIG. 10, coupling 600 further comprises a cover, shown as end cap 660. End cap 660 may prevent debris from entering the end of tube 610. As shown in FIG. 10, end cap 660 includes a resilient member, shown as seal 662 disposed between a portion of end cap 660 and tube 610. End cap 660 may be coupled to tube 610 according with any suitable means. As shown in FIG. 10, end cap 660 is coupled to tube 610 with a threaded connection, shown as threaded interface 664. Such a combination of elements may allow coupler 600 to interlock the rotation of a swing arm and sway bar 620 to allow sway bar 620 to transmit imparted torque to the opposite side of the vehicle thereby providing the various advantages discussed above. Such a configuration allows first swing arm 20 to rotate about a centerline of sway bar 70 because the axis of rotation of sway bar 70 is positioned coaxially with a pivot axis of the swing arm.

The construction and arrangements of the suspension assembly, as shown in the various exemplary embodiments, are illustrative only. Although only a few embodiments have been described in detail in this disclosure, many modifications are possible (e.g., variations in sizes, dimensions, structures, shapes and proportion of the various elements, values of parameters, mounting arrangements, use of materials, colors, orientations, etc.) without materially departing from the novel teachings and advantages of the subject matter described herein. Some elements shown as integrally formed may be constructed of multiple connectors or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present application.

The invention claimed is:

1. A suspension system for a vehicle having a frame, the suspension system comprising:
   a first interface member configured to be positioned on a first lateral side of the frame;
   a second interface member configured to be positioned on an opposing second lateral side of the frame, wherein the first interface member and the second interface member are positioned along a common central axis;

a connector coupled to the first interface member, the connector comprising:
  an outer support member configured to be coupled to the frame of a heavy duty truck or trailer; and
  an inner race coupled to an outer surface of the first interface member and positioned at least partially within the outer support member;
a flange extending radially outward from the outer surface of the first interface member;
a thrust bearing disposed between the flange and at least one of the inner race and the outer support member, wherein the flange is configured to engage the thrust bearing and limit axial movement of the first interface member;
a first swing arm coupled to the first interface member and configured to rotate about the common central axis;
a second swing arm coupled to the second interface member and configured to rotate about the common central axis; and
a sway bar coupled to the first interface member with a first splined connection and coupled to the second interface member with a second splined connection, the sway bar positioned coaxially with the common central axis and extending between the first swing arm and the second swing arm.

2. The suspension system of claim 1, wherein the first splined connection includes a male and female spline having a first diameter and the second splined connection includes a male and female spline having a second diameter that is greater than the first diameter.

3. The suspension system of claim 1, wherein the first splined connection includes a first number of teeth and the second splined connection includes a second number of teeth.

4. A suspension system for a vehicle having a frame, the suspension system comprising:
  a first swing arm configured to be positioned on a first lateral side of the frame;
  a first interface member coupled to the first swing arm;
  a second swing arm configured to be positioned on an opposing second lateral side of the frame;
  a second interface member coupled to the second swing arm;
  a connector coupled to the first interface member, the connector comprising:
    an outer support member configured to be coupled to the frame of a heavy duty truck or trailer; and
    an inner race coupled to an outer surface of the first interface member and positioned at least partially within the outer support member;
  a flange extending radially outward from the outer surface of the first interface member;
  a thrust bearing disposed between the flange and at least one of the inner race and the outer support member, wherein the flange is configured to engage the thrust bearing and limit axial movement of the first interface member; and
  a torsion spring extending through at least a portion of the first swing arm and at least a portion of the second swing arm, the torsion spring coupled to the first interface member with a first splined connection and coupled to the second interface member with a second splined connection, wherein the torsion spring is a continuous bar that defines a central axis about which both the first swing arm and the second swing arm rotate.

5. The suspension system of claim 4, wherein the first splined connection includes a male and female spline having a first diameter and the second splined connection includes a male and female spline having a second diameter that is greater than the first diameter.

6. The suspension system of claim 4, wherein the first splined connection includes a first number of teeth and the second splined connection includes a second number of teeth.

7. The suspension system of claim 4, further comprising a cap coupled to at least one of an end of the torsion spring and the first interface member, wherein the cap is positioned to limit movement of the torsion spring along the central axis.

8. A suspension system for a vehicle having a frame, comprising:
  a first interface member;
  a second interface member, wherein the first interface member and the second interface member are positioned along a common central axis;
  a connector coupled to the first interface member, the connector comprising:
    an outer support member configured to be coupled to the frame of a heavy duty truck or trailer; and
    an inner race coupled to an outer surface of the first interface member and positioned at least partially within the outer support member;
  a flange extending radially outward from the outer surface of the first interface member;
  a thrust bearing disposed between the flange and at least one of the inner race and the outer support member, wherein the flange is configured to engage the thrust bearing and limit axial movement of the first interface member;
  a first body member coupled to the first interface member and configured to rotate about the common central axis;
  a second body member coupled to the second interface member and configured to rotate about the common central axis; and
  a torsion spring coupled to the first interface member with a first splined connection and coupled to the second interface member with a second splined connection, wherein the torsion spring is disposed along the common central axis.

* * * * *